Figure 1:
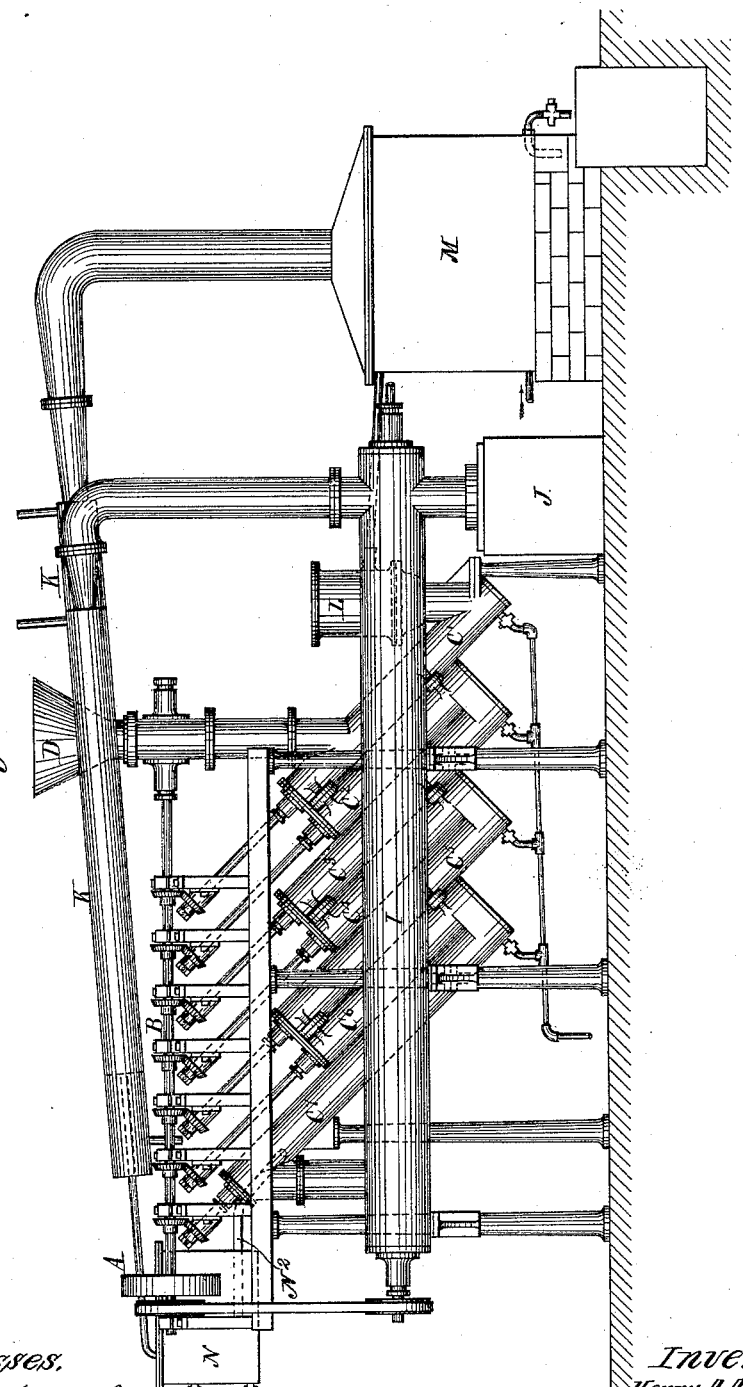

(No Model.) 2 Sheets—Sheet 1.

H. A. A. DOMBRAIN & O. TRUMPER.
APPARATUS FOR EXTRACTING OIL.

No. 431,937. Patented July 8, 1890.

Witnesses.
J. G. Meyer Jr.
Robert Everett

Inventors,
Henry A. A. Dombrain
Oliver Trumper,
By James L. Norris.
Atty.

(No Model.) 2 Sheets—Sheet 2.
H. A. A. DOMBRAIN & O. TRUMPER.
APPARATUS FOR EXTRACTING OIL.
No. 431,937. Patented July 8, 1890.
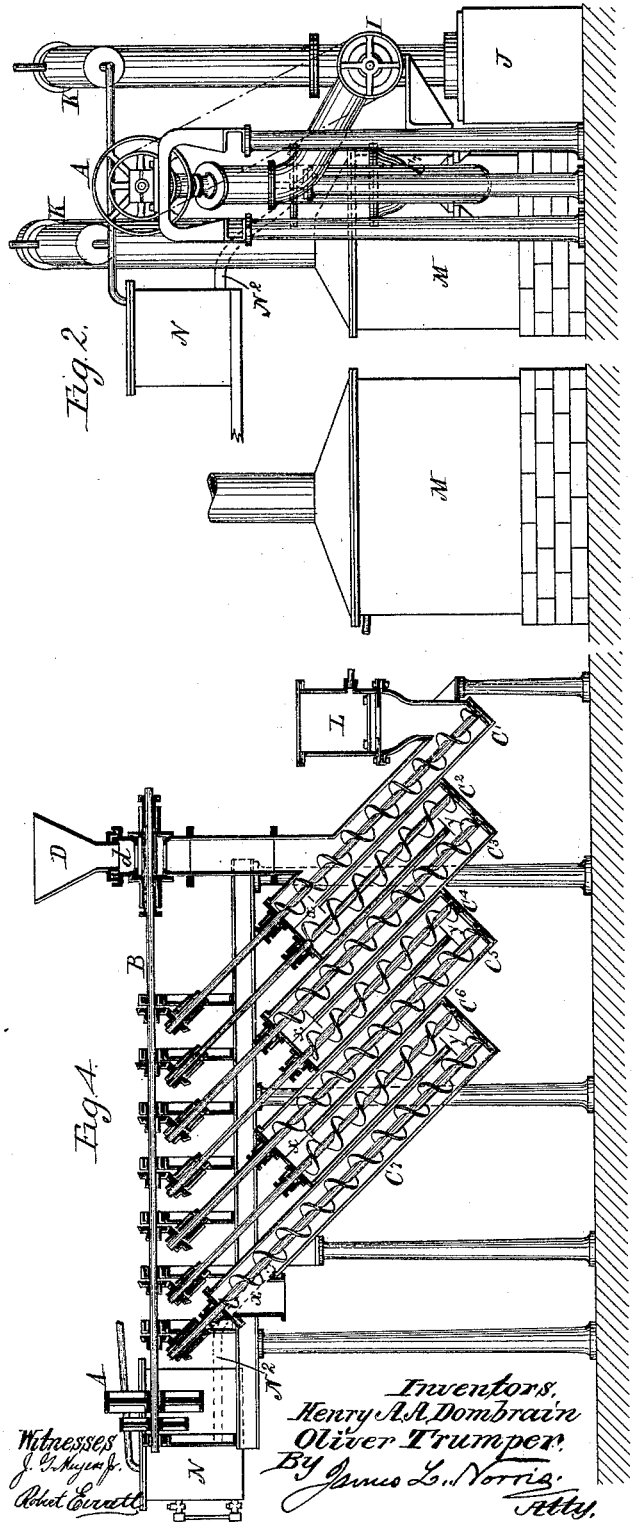
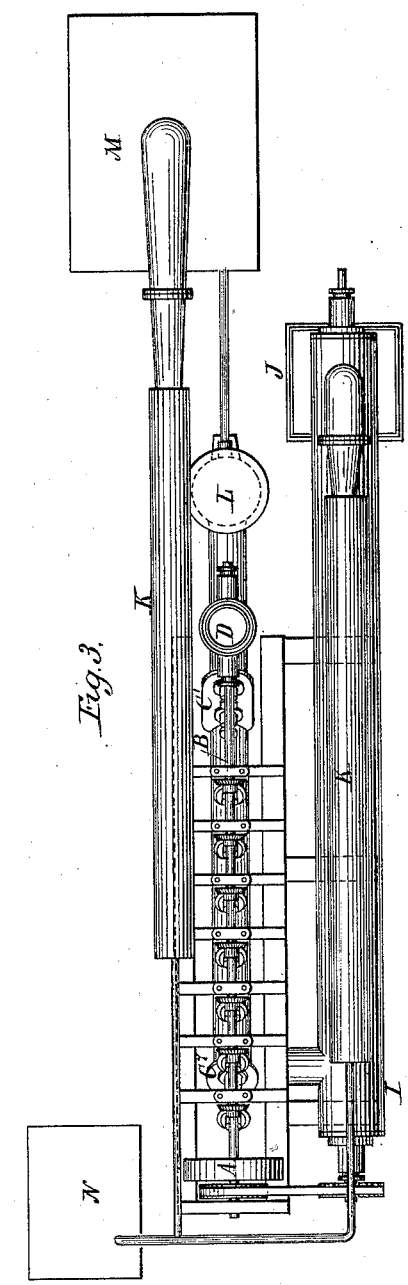

United States Patent Office.

HENRY ATHELSTAN ACWORTH DOMBRAIN, OF LEEDS, COUNTY OF YORK, AND OLIVER TRUMPER, OF STRATFORD, COUNTY OF ESSEX, ENGLAND.

APPARATUS FOR EXTRACTING OIL.

SPECIFICATION forming part of Letters Patent No. 431,937, dated July 8, 1890.

Application filed January 16, 1890. Serial No. 337,051. (No model.) Patented in England November 16, 1889, No. 18,345; in France January 4, 1890, No. 202,968; in Belgium February 28, 1890, No. 89,667, and in Italy March 28, 1890, LIII, 135.

*To all whom it may concern:*

Be it known that we, HENRY ATHELSTAN ACWORTH DOMBRAIN and OLIVER TRUMPER, citizens of England, residing, respectively, at Calverly, Leeds, in the county of York, England, and at No. 40 Louise Road, Water Lane, Stratford, in the county of Essex, England, have invented a new and useful Apparatus for Extracting Fatty and other Matters from Substances by Means of Volatile Solvents, (for which we have obtained patents in France dated January 4, 1890, No. 202,968; in Belgium, dated February 28, 1890, No. 89,667; in Italy, dated March 28, 1890, Vol. LIII, 135, and in Great Britain by an application for patent, which patent, when granted, will bear date November 16, 1889, No. 18,345,) of which the following is a specification.

Our invention relates to apparatus for extracting fatty and other matters from substances by means of volatile solvents—as, for example, for extracting oils from seeds or from fragments of fish by means of carbon bisulphide.

The chief object which we have in view is to bring the solvent fully in contact with all parts of the substance on which it has to act throughout a long course of travel through the apparatus, the travel of the solvent and of the substance acted on being in contrary directions, so that the solvent most saturated with the extracted matter is last in contact with the substance containing most of the matter to be extracted, and conversely. For this purpose we place side by side a number of inclined cylindrical cells, in each of which there is a rotating worm. The first, third, and every odd cell communicate, respectively, by lateral openings at their upper ends with the second, fourth, and other even cells, and the second, fourth, and other even cells communicate at their lower ends with the third, fifth, and other odd cells, the total number of cells being odd.

The substance to be treated—such as seeds, fragments of fish, or other oil-bearing materials—are fed from a hopper or otherwise, preferably through an intermittently-acting valve arranged to prevent escape of vapor of the solvent, into the first of the inclined cells, the worm of which causes it to ascend to the opening at the upper end. Through this opening the substance drops into the upper part of the second cell, which it descends. Through the opening at the lower end of the second cell it passes into the third cell, which it ascends, and thus it is caused to take a zigzag course through the apparatus, being kept by the rotating worms in continual movement and agitation. From the opening at the upper end of the last cell the substance descends into a receptacle or onto a conveyer, by which it is removed. While the solid granular or fragmentary substance is thus moved through the apparatus the liquid solvent fed in at the upper part of the last cell descends it, ascends the next, and so on, taking the same zigzag course as the solid matter, but in the opposite direction, and finally passes from the first of the cells through a filter and is led to a still. By the reaction of the solvent on the solid substance most of the oil and fatty matters are extracted in a state of solution in the solvent, which, being distilled off for subsequent use, leaves the oily or fatty matter separate. As the solid substance operated on carries with it on its delivery a quantity of solvent absorbed in it or adhering to it we cause the discharged matter to be conveyed by a worm along a steam-jacketed cylinder, so as to volatilize the solvent. The vapor of the solvent generated in this cylinder passes along with that from the still to a condenser.

Although we have described carbon-bisulphide as a solvent suitable for extraction of oils and fatty matters, obviously the apparatus might be applied for extraction of other products by the use of other solvents. As many available solvents are combustible and have vapors more or less noxious, it is of advantage to immerse the whole apparatus in water, so as to aid in preventing escape or combustion of fumes.

Such being the general character of the apparatus which we employ, we shall describe more particularly its construction and arrangements, referring to the accompanying drawings.

Figure 1 is a side elevation, Fig. 2 is an end view, Fig. 3 is a plan, and Fig. 4 is a longitudinal section, of the extracting apparatus. Fig. 5 is a transverse section of the feed-valve.

By a belt and pulley A or other gearing rotation is given to a shaft B, from which, by bevel-gear, rotation is communicated to the worms, of which there is one in each of the inclined cells $C'$ to $C^7$. Each of these cells communicates with the next cell in order by openings $x$ at the upper ends and by openings $y$ at the lower ends of alternate pairs. The first cell $C'$ is fed from a hopper D, through a rotating valve $d$, admitting the solid material to be treated and preventing escape of vapor. The worm in $C'$ raises the material to the upper opening $x$, by which it passes into $C^2$. In $C^2$ it is caused to descend by the worm, which is to the reverse hand of that in $C'$. From $C^2$ it passes by the lower opening $y$ into $C^3$, in which it ascends, and thus the material is caused to pass alternately up and down in a zigzag course till it passes by the opening $x$ of the last cell $C^7$ into the steam-jacketed cylinder I, constituting a vaporizing-chamber. In this chamber the material is propelled by a worm till it is delivered into the receptacle J. While the solid material is thus made to travel along the cells $C'$ to $C^7$, the carbon-bisulphide or other liquid solvent is admitted from receptacle N by a pipe indicated by dotted lines $N^2$ into the upper part of the last cell $C^7$, and this solvent flows down this cell and up the next, and so on, in a direction opposite to that of the solid matter, becoming more and more charged with the fatty or other matter extracted by it until finally it is delivered through a filter L into the still M. The circuit of the solvent occurs by reason of the fact that it naturally flows from a higher to a lower level. It enters the upper end of the cell $C^7$, which is above the level where it discharges into the filter L, and consequently the solvent will flow from the higher to the lower level, notwithstanding the number of intermediate cells. The vapors of the solvent from the still M, and also that from the vaporizing-chamber I, are passed through condensers K, from which the condensed liquid flows into the receptacle N to pass again through the extracting-cells. Although we have shown seven cells, there might be a less or greater odd number of these, the last one being the highest in order to insure the flow of the solvent toward the still. The still M may be of any known suitable construction, heated by steam, or otherwise, so as to vaporize the solvent, thus separating it from the molten fatty matter which collects at the lower part of the still, and can be run off continuously or at intervals. The condensers K may also be of any suitable known construction, such as a pipe-coil or set of tubes cooled by water-circulation. The cells C may have small stop-cocks in their upper parts to allow escape of air when they are charged. We prefer, however, to lead small branch air-pipes from them to the filter L, so that if any of the solvent should accompany the air it will not be wasted.

Having thus described the nature of our invention and the best means we know of carrying the same into practical effect, we claim—

For extracting fatty and other matters from substances by means of volatile solvents, apparatus consisting of a number of inclined cells, each provided with a rotating worm, and communications such that the material is caused to pass up and down in a zigzag course through the successive cells while the liquid solvent flows through them in the opposite direction, in combination with a vaporizing-cell, a still, and suitable condensers, substantially as described.

In testimony whereof we have signed our names to this specification, in the presence of two subscribing witnesses, on this 23d day of December, A. D. 1889.

HENRY ATHELSTAN ACWORTH DOMBRAIN.
OLIVER TRUMPER.

Witnesses:
CHARLTON E. BAIN,
A. W. BAIN.